(No Model.)
G. R. BOYD.
CUTTER HEAD.
No. 601,932. Patented Apr. 5, 1898.
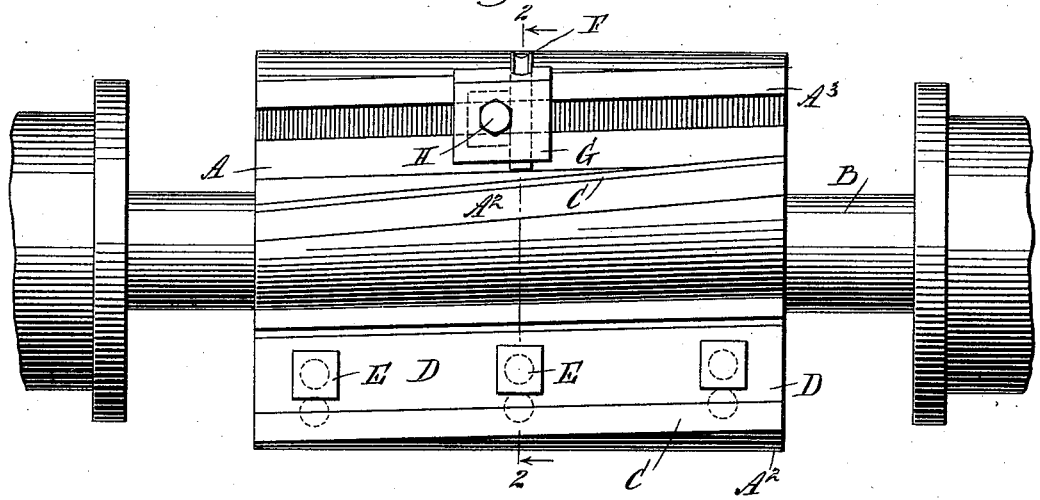
Fig. 1.
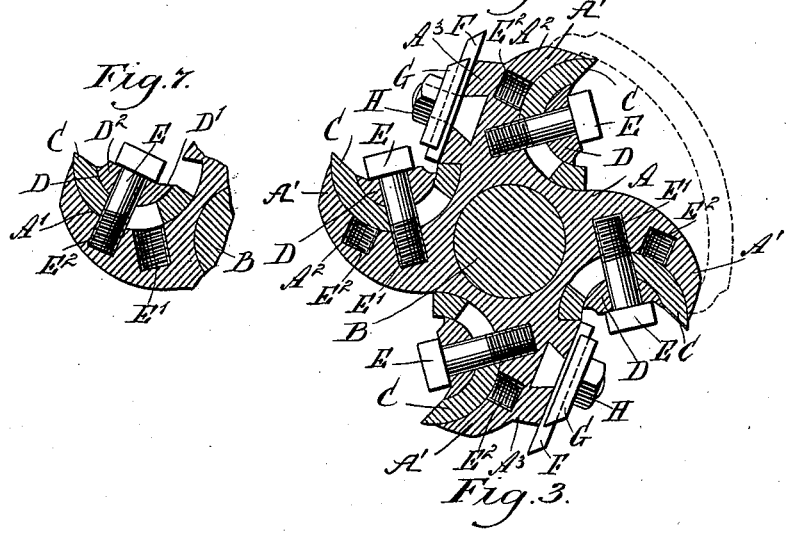
Fig. 7. Fig. 2. Fig. 5.
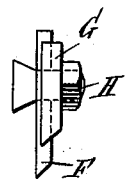
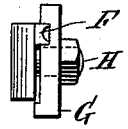
Fig. 6.
Fig. 3.
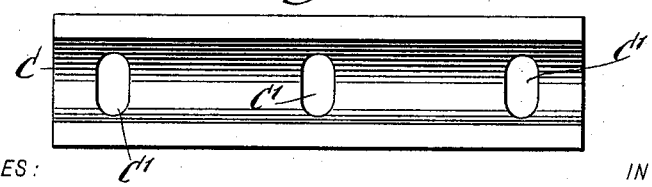
Fig. 4.
WITNESSES: Edward Thorpe
INVENTOR G. R. Boyd
ATTORNEYS.
THE NORRIS PETERS CO., PHOTO-LITHO., WASHINGTON, D. C.

UNITED STATES PATENT OFFICE.

GEORGE R. BOYD, OF CAIRO, ILLINOIS, ASSIGNOR OF THREE-FOURTHS TO CHARLES S. CAREY AND ERNEST LEMEN, OF SAME PLACE.

CUTTER-HEAD.

SPECIFICATION forming part of Letters Patent No. 601,932, dated April 5, 1898.

Application filed September 7, 1897. Serial No. 650,777. (No model.)

*To all whom it may concern:*

Be it known that I, GEORGE R. BOYD, of Cairo, in the county of Alexander and State of Illinois, have invented a new and Improved Cutter-Head, of which the following is a full, clear, and exact description.

The invention relates to woodworking machinery; and its object is to provide a new and improved cutter-head for planers and other machines and arranged to readily cut rough, cross-grained, and knotty lumber very smooth and without tearing up the grain or jerking out the knots, and at the same time permitting of turning the cutter-head at a high rate of speed, so as to allow a mill-owner to advantageously work up considerable stock that would otherwise be disposed of as culls on account of the difficulty of working up such stock at a profit.

The invention consists principally of a cylindrical body formed with longitudinal grooves segmental in cross-section and at an angle to the cutting-plane, segmental cutters adjustably held in the said grooves, and reversible keys fitting upon the cutters and adapted to be secured to the said body with either edge of a key adjacent to the cutting edge of the corresponding cutter.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a transverse section of the same on the line 2 2 of Fig. 1. Fig. 3 is a face view of one of the cutters. Fig. 4 is a similar view of one of the keys. Fig. 5 is an edge view of the bead-cutter and the means for fastening the same in place on the body. Fig. 6 is an end view of the same, and Fig. 7 is a cross-section of part of the body with the reversible key for fastening the cutter in a different position.

The improved cutter-head is provided with a cylindrical body A, secured or formed on a spindle B and provided in its periphery with grooves A', set slightly at an angle to the cutting-plane, as is plainly indicated in Fig. 2, each of the grooves being adapted to receive a segmental knife C, engaged at its top surface by a correspondingly-shaped key D, fastened in place by screws E, extending through elongated slots C' in the cutters and each screwing in one of two apertures E' or $E^2$, formed in the body A, as is plainly indicated in Figs. 2 and 7. The segmental grooves A' in the body A form lips $A^2$ for engaging the back of the corresponding cutter close to the cutting edge thereof, the outer surface of each lip forming part of the cylindrical surface of the body, as will be readily understood by reference to Fig. 2.

By the arrangement described the cutting edge of each cutter stands slightly beyond the cylindrical surface of the lip, so that chips are not liable to pass into the adjacent surfaces between the lip and the cutter.

Each of the keys D is provided with an outwardly-extending flange D' at one side and with a cut-out portion $D^2$ at the other side to permit of using the keys in two positions, as shown in Figs. 2 and 7, according to the width of the cutter C. The keys D being thus constructed may be arranged in the position shown in Fig. 2, when the cutters C are of the comparative width shown in such figure; but when the cutters are ground down and their widths reduced the keys D are reversed to the position shown in Fig. 7, the cut-out portions $D^2$ being then directly adjacent to the edges of the respective cutters.

Having the two screw-holes E' and $E^2$ with a reversible key D, I am enabled to readily change the knives C, so that when the knives are worn considerably the screws are taken out of the holes E' and the key is reversed, and then the screws are placed in the other holes $E^2$, so as to have the screws near the center of the segmental cutters C to hold said cutters firmly against the lip of the segmental groove, which would not be the case if the bolts remained near the back edge of the cutter.

On two oppositely-arranged lips $A^2$ are formed dovetailed projections $A^3$ for carrying bead-cutters F, engaged by a clamping-plate G, held on a bolt H, having its beveled head slidable in the dovetail in the projection $A^3$.

The cutter F is used for forming a bead on boards used for ceilings and the like.

Now it will be seen that by the arrangement described chips are not liable to work between the knife and the lips of the cylinder, as is so frequently the case in cutters heretofore constructed, and it will further be seen that the lips $A^2$ remove the principal strain from the bolts E, thus permitting the latter to securely clamp the knives in place on the lips by the use of the keys, as above described.

In Fig. 2 is shown by dotted lines the usual gage for setting the cutting edges of the tool.

Having thus fully described my invention, I claim as new and desire to secure by Letters Patent—

1. A cutter-head having a cylindrical body portion having longitudinal grooves in its periphery, such grooves having arc-shaped surfaces running outward and disposed tangentially to the body portion, cutters arranged respectively in the grooves and lying snugly against the arc-shaped surfaces thereof, the cutters projecting beyond the body portion and having transversely elongate slots therein, keys laid respectively on the cutters, and screws passed through the keys and through the slots of the cutters, the grooves engaging screw-holes in the body portion and the body portion having a plurality of holes for each screw so that the cutters and grooves may be adjusted.

2. A cutter-head having a body portion with a groove therein, the groove having an arc-shaped surface, an arc-shaped cutter laid in said groove and adjustable transversely therein, a key curved to conform to the cutter and having at one side an outwardly-extending flange and the opposite side being cut out, and a bolt passed through the key and cutter and engaging the body portion.

GEORGE R. BOYD.

Witnesses:
P. H. GRIMES,
E. C. STEINHOUSE.